United States Patent
Venkatesan et al.

(10) Patent No.: US 10,776,469 B2
(45) Date of Patent: Sep. 15, 2020

(54) METHOD FOR GENERATING 3D BIOMETRIC MODEL OF BODY PART OF USER AND ELECTRONIC DEVICE THEREOF

(71) Applicant: Samsung Electronics Co., Ltd., Suwon-si, Gyeonggi-do (KR)

(72) Inventors: Shankar Mosur Venkatesan, Bangalore (IN); Vijay Narayan Tiwari, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 127 days.

(21) Appl. No.: 16/038,749

(22) Filed: Jul. 18, 2018

(65) Prior Publication Data
US 2019/0026451 A1    Jan. 24, 2019

(30) Foreign Application Priority Data

Jul. 18, 2017    (IN) .............................. 201741025468

(51) Int. Cl.
*G06F 21/32*    (2013.01)
*G06K 9/00*    (2006.01)
(Continued)

(52) U.S. Cl.
CPC .......... *G06F 21/32* (2013.01); *G06K 9/00013* (2013.01); *G06K 9/00033* (2013.01); *G06K 9/00201* (2013.01); *G06K 9/00375* (2013.01); *G06K 9/00604* (2013.01); *G06K 9/2036* (2013.01); *G06T 17/00* (2013.01); *G06K 2009/0006* (2013.01); *G06K 2009/00932* (2013.01)

(58) Field of Classification Search
None
See application file for complete search history.

(56) References Cited

U.S. PATENT DOCUMENTS

| | | | | |
|---|---|---|---|---|
| 7,734,074 B2* | 6/2010 | Setlak | ................ | G06K 9/00026 283/68 |
| 9,396,382 B2* | 7/2016 | Troy | .................. | G06K 9/00093 |

(Continued)

FOREIGN PATENT DOCUMENTS

| | | |
|---|---|---|
| KR | 10-2004-0006703 A | 1/2004 |
| KR | 10-1728970 B1 | 4/2017 |

OTHER PUBLICATIONS

Yu Lu et al., Finger vein identification system using two cameras, http://ieeexplore.ieee.org/document/6937271/, Oct. 23, 2014, vol. 50, No. 22, pp. 1591-1593.

(Continued)

*Primary Examiner* — Fayyaz Alam
(74) *Attorney, Agent, or Firm* — Jefferson IP Law, LLP

(57) ABSTRACT

A method for generating a three-dimensional (3D) biometric model of a user's body part is provided. The method includes detecting, by at least one imaging sensor of the electronic device, the body part, capturing by the at least two imaging sensors a first image of a first portion of the body part and a second image of a second portion of the body part, generating the 3D biometric model of the body part using the first image and the second image of the body part, and storing the 3D biometric model of the body part.

20 Claims, 12 Drawing Sheets

(51) Int. Cl.
  *G06T 17/00* (2006.01)
  *G06K 9/20* (2006.01)

(56) References Cited

U.S. PATENT DOCUMENTS

| | | | |
|---|---|---|---|
| 2006/0071111 A1 | 4/2006 | Tanaka et al. | |
| 2014/0292676 A1 | 10/2014 | Hayashi et al. | |
| 2015/0146945 A1* | 5/2015 | Han | G06F 21/32 382/125 |
| 2016/0253675 A1* | 9/2016 | Remillet | G06K 9/00892 705/44 |
| 2017/0124370 A1 | 5/2017 | He et al. | |
| 2019/0332853 A1* | 10/2019 | Price | G06K 9/00288 |

OTHER PUBLICATIONS

Eiji Nakamachi et al., Development of Automatic 3D Blood Vessel Search and Automatic Blood Sampling System by Using Hybrid Stereo-Autofocus Method, https://www.hindawi.com/journals/ijo/2012/258626/, Research Article, vol. 2012, Article ID 258626, 11 pages, Hindawi Publishing Corporation, International Journal of Optics.

Yusuke Matsuda et al., Walkthrough-Style Multi-Finger Vein Authentication, http://ieeexplore.ieee.org/document/7889388/, 2017 IEEE International Conference on Consumer Electronics (ICCE).

F. P. Wieringa et al., Remote Non-invasive Stereoscopic Imaging of Blood Vessels: First In-vivo Results of a New Multispectral Contrast Enhancement Technology, https://www.ncbi.nlm.nih.gov/pmc/articles/PMC1705509/, Annals of Biomedical Engineering, vol. 34, No. 12, Dec. 2006, pp. 1870-1878.

David Mulyono et al., A Study of Finger Vein Biometric for Personal Identification, http://ieeexplore.ieee.org/document/4547655/.

International Search Report dated Oct. 23, 2018, issued in International Application No. PCT/KR2018/008112.

European Search Report dated Apr. 9, 2020, issued in European Patent Application No. 18834583.9.

Extended European Search Report dated Jul. 10, 2020, issued in European Patent Application No. 18834583.9.

* cited by examiner

METHOD FOR GENERATING 3D BIOMETRIC MODEL OF BODY PART OF USER AND ELECTRONIC DEVICE THEREOF

CROSS-REFERENCE TO RELATED APPLICATION(S)

This application is based on and claims priority under 35 U.S.C. § 119 of an Indian patent application number 201741025468, filed on Jul. 18, 2017, in the Indian Intellectual Property Office and of an Indian patent application number 201741025468, filed on Jul. 5, 2018, in the Indian Intellectual Property Office, the disclosure of each of which is incorporated by reference herein in its entirety.

BACKGROUND

1. Field

The disclosure relates to three-dimensional (3D) modeling using electronic devices. More particularly, the disclosure relates to an electronic device and method for generating a 3D biometric model of a body part of a user.

2. Description of the Related Art

In general, biometric identification is widely used in various applications such as forensics, government agencies, banking and financial institutions, enterprise identity management, and other identification and recognition applications. Multiple technologies have been developed for biometric identification of individuals using physical features fingerprints, retinal, iris, voice, facial features, finger vein pattern, palm vein pattern, etc.

One of the most promising methods of biometric identification is infrared imaging of the subcutaneous vein pattern of the finger. A two-dimensional (2D) finger vein pattern is obtained by illuminating a finger with a light at a specific wavelength (e.g., near infrared) such that the light is absorbed by blood in the finger veins according to the related art. The scattered light is then detected by imaging sensors to produce a 2D image of the finger vein pattern where the finger-vein pattern appears as a 2D network of dark lines.

A 2D model of the body part may not be able to capture all the information necessary for feature extraction due to low compatibility to illumination. Further, creating an imitation of the 2D model of the body part can be easily achieved, which makes the systems which use 2D biometrics susceptible to spoofing attacks.

However, the three-dimensional (3D) models of the body parts used for biometric identification capture more information necessary for feature extraction and hence are difficult to be imitated. However, the equipment that is used for generating the 3D models of the body parts are bulky and expensive.

The above information is presented as background information only to assist with understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and method for generating a three-dimensional (3D) biometric model of a body part of a user.

Another aspect of the disclosure is to capture a first image of a first portion of a body part and a second image of a second portion of the body part.

Another aspect of the disclosure is to determine whether the first image of the first portion of the body part and the second image of the second portion of the body part overlaps.

Another aspect of the disclosure is to dynamically generate the 3D biometric model of the body part using the first image and the second image of the body part, on determining that the first image of the first portion of the body part and the second image of the second portion of the body part overlaps at a given instant of time.

Another aspect of the disclosure is to capture a delayed video of the body part, on determining that the first image of the first portion of the body part and the second image of the second portion of the body part do not overlap at a given instant of time.

Another aspect of the disclosure is to compare the 3D biometric model of the body part of the user with the 3D biometric model of the body part of the user already stored in the electronic device and perform actions on the electronic device based on a successful authentication.

Another aspect of the disclosure is to use the 3D biometric model of the body part of the user as spoof-free live biometrics.

Additional aspects will be set forth in part in the description which follows and, in part, will be apparent from the description, or may be learned by practice of the presented embodiments.

In accordance with an aspect of the disclosure, a method for generating a three-dimensional (3D) biometric model of a user's body part is provided. The method includes detecting, by at least one imaging sensor of the electronic device, the body part, capturing, by the at least two imaging sensors a first image of a first portion of the body part and a second image of a second portion of the body part, generating the 3D biometric model of the body part using the first image and the second image of the body part, and storing the 3D biometric model of the body part of the user.

In accordance with another aspect of the disclosure, an electronic device for generating a 3D biometric model of a user's body part is provided. The electronic device includes a memory, at least one processor, at least one imaging sensor coupled to the at least one processor, and a 3D modeling engine. The at least two imaging sensors are configured to detect the body part and capture a first image of a first portion of the body part and a second image of a second portion of the body part. The 3D modeling engine is configured to generate the 3D biometric model of the body part using the first image and the second image of the body part and store the 3D biometric model of the body part. The memory is configured to store the 3D biometric model of the body part.

Other aspects, advantages, and salient features of the disclosure will become apparent to those skilled in the art from the following description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
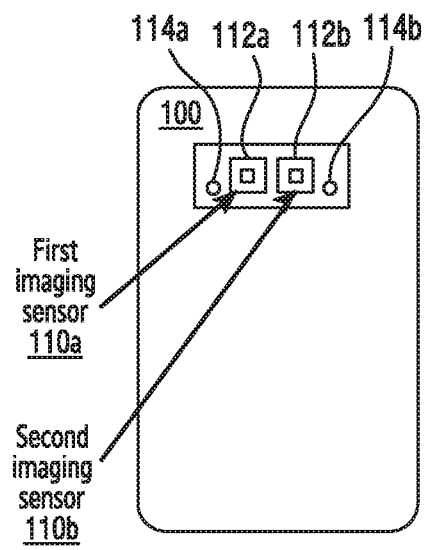
FIGS. 1A, 1B, 1C, and 1D are illustrations in which an electronic device generates a three-dimensional (3D) biometric model of a body part of a user, according to various embodiments of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The various embodiments described herein are not necessarily mutually exclusive, as some embodiments can be combined with one or more other embodiments to form new embodiments.

The term "or", as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein provide a method for generating a three-dimensional (3D) biometric model of a body part of a user. The method includes detecting by at least two imaging sensors of the electronic device the body part of the user and automatically capturing by the at least two imaging sensors a first image of a first portion of the body part and a second image of a second portion of the body part. Further, the method includes dynamically generating the 3D biometric model of the body part using the first image and the second image of the body part.

In an embodiment, the body part of the user is within a field of view (FOV) of the at least two imaging sensors.

In an embodiment, the first image and the second image of the body part are automatically captured by the at least two imaging sensors. The method includes illuminating by a second imaging sensor from the at least two imaging sensors the first portion of the body part and capturing by the first imaging sensor the first image of the first portion of the body part. The method includes detecting a sliding movement of the body part, where the body part is slid to bring the body part from the FOV of the first imaging sensor into the FOV of the second imaging sensor. The method includes illuminating by the first imaging sensor from the at least two imaging sensors the second portion of the body part and capturing by the second imaging sensor the second image of the second portion of the body part.

Dynamically generating the 3D biometric model of the body part using the first image and the second image of the body part includes determining whether at least one location of the first portion in the first image of the body part overlaps with the second portion in the second image of the body part at a given instant of time. On determining that the at least one location of the first portion in the first image of the body part overlaps with the second portion in the second image of the body part at the given instant of time, the method includes dynamically generating the 3D biometric model of the body part using the first image and the second image of the body part. On determining that the at least one location of the first portion in the first image of the body part does not overlap with the second portion in the second image of the body part at the given instant of time, the method includes capturing a video of the body part by sliding the body part along the at least two imaging sensors, where the first portion in the first image of the body part will overlap with the second portion of the second image of the body part at a later time when the body part has slid at a determinable speed.

The body part may be one of a finger and an eye of the user.

Unlike the methods of the related art, which generate two dimensional (2D) models of body parts which are used in biometric identification, the proposed method includes generating the 3D biometric model of body parts which are more robust to illumination, provides a more information which can be used for feature extraction, and are difficult to be replicated.

Unlike to the methods and system of the related art, the proposed method allows for the generation of the 3D biometric model of the body part which cannot be easily replicated and used for spoofing the systems.

In the methods and systems of the related art, the 3D biometric models are generated using epipolar constraint and homography constraint which require large equipment. Further, the equipment required for focusing on the finger vein patterns in order to capture sharp images are also expensive. Unlike the methods and systems of the related art, the proposed method provides for generating the 3D biometric model using a dual-camera of the electronic device.

Unlike to the methods and systems of the related art, which use sophisticated devices for capturing the iris of the user, the proposed method allows the user to capture the iris using the dual-camera of the electronic device.

Referring now to the drawings, and more particularly to FIGS. 1 through 8, where similar reference characters denote corresponding features consistently throughout the figures, there are shown preferred embodiments.

FIGS. 1A, 1B, 1C, and 1D are example illustrations in which an electronic device generates a 3D biometric model of a user's body part or, according to various embodiments of the disclosure.

Referring to the FIG. 1A, the electronic device 100 includes two imaging sensors, a first imaging sensor 110a and a second imaging sensor 110b. Each imaging sensor includes an image capturing sensor 112a or 112b and an illuminating sensor 114a or 114b. The first imaging sensor 110a and the second imaging sensor 110b are activated alternatively with cross-pairing of the image capturing sensor and the illuminating sensor to capture the image of the body part of the user.

Figure 1B:
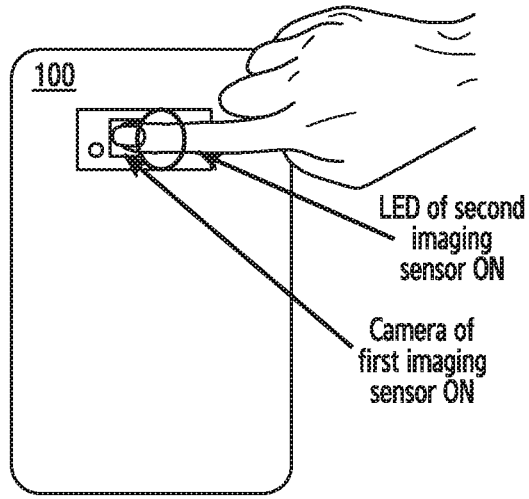

Referring to FIG. 1B, the at least two imaging sensors 110a and 110b determine that the user has placed the finger on the at least two imaging sensors 110a and 110b in the specified direction. The illuminating sensor 114b of the second imaging sensor 110b and the image capturing sensor 112a of the first imaging sensor 110a are activated simultaneously by the user. A first image comprising the first portion of the finger vein structure is captured.

Figure 1C:
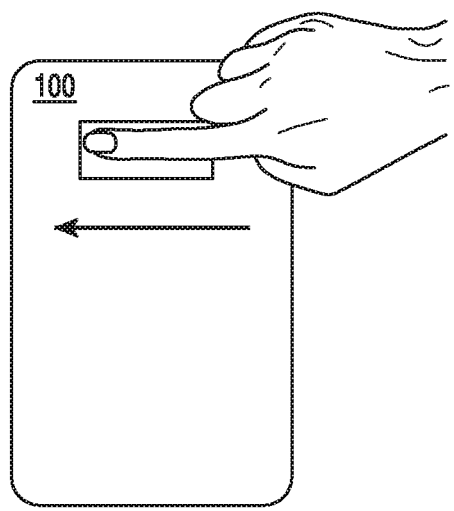

Referring to FIG. 1C, the first imaging sensor 110a and a second imaging sensor 110b then detects a sliding motion of the finger when the user moves the finger in the direction as indicated by the arrow, along the first imaging sensor 110a and a second imaging sensor 110b.

Figure 1D:
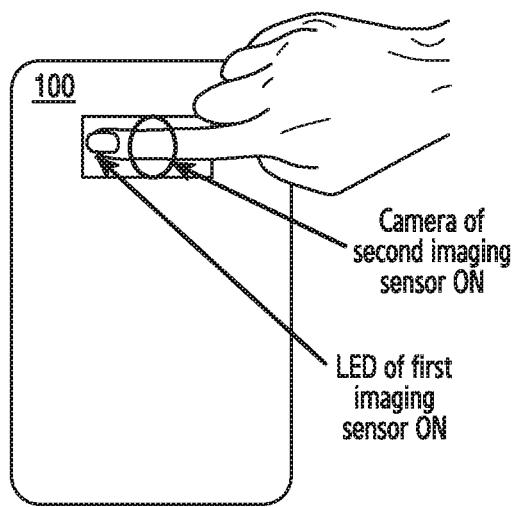

Referring to the FIG. 1D, the illuminating sensor of the first imaging sensor 110a and the image capturing sensor of the second imaging sensor 110b are activated simultaneously by the user. A second image comprising the second portion of the finger vein structure is captured. The electronic device 100 determines whether the first image and the second image are of the same portion of the finger of the user at the given instant of time.

Upon determining that the first image and the second image are of the same portion of the finger of the user, the electronic device 100 generates the 3D biometric model of the finger vein structure using the first image and the second image of the finger vein structure.

Upon determining that the first image and the second image are not of the same portion of the finger, the electronic device 100 captures a delayed video of the finger vein structure of the user by prompting the user to slide the finger along the at least two imaging sensors 110a and 110b. The delayed video of the finger captures the finger of the user in the multiple frames of the video. The electronic device 100 compares the multiple frames and determines the frames that have captured the same portion of the finger (i.e., the frames which have captured the same portion of the finger vein structure). The electronic device 100 uses the frames comprising the same portion of the finger to generate the 3D biometric model of the finger vein structure.

Figure 2:
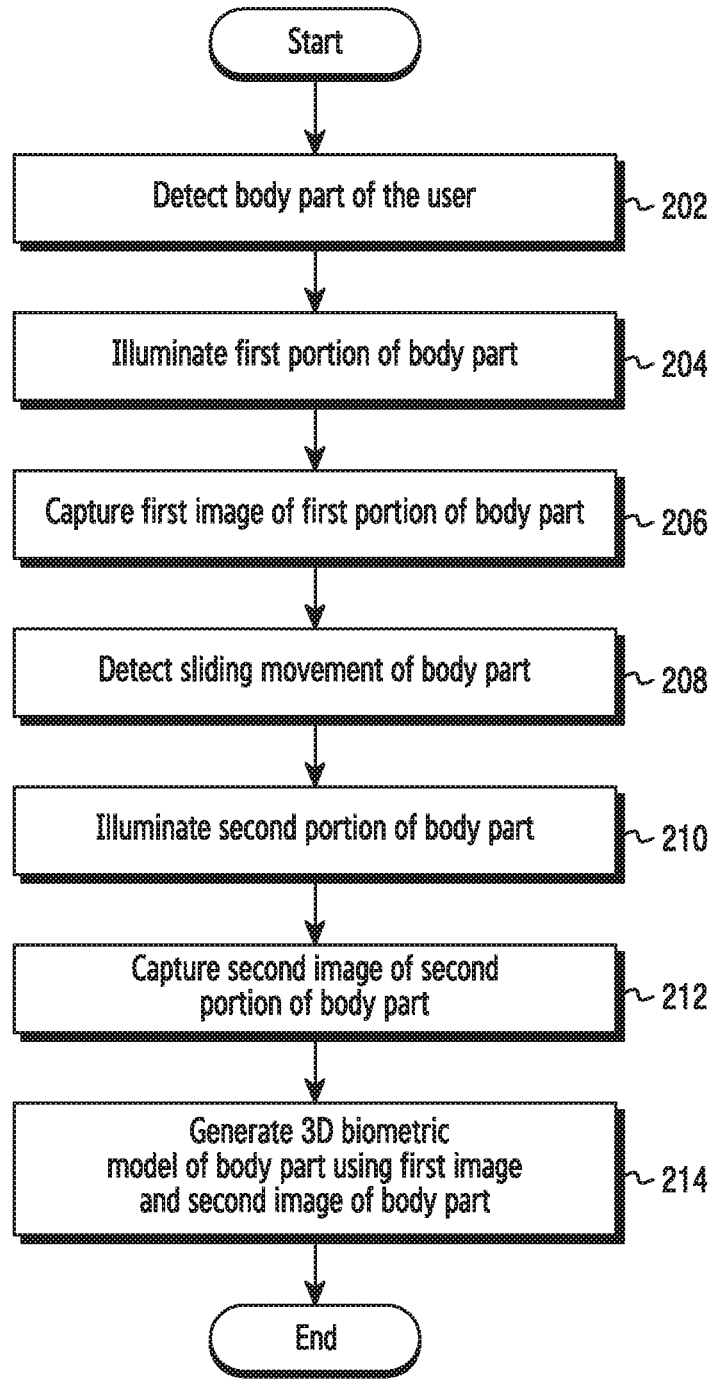
FIG. 2 is a flow chart illustrating a method for generating a 3D biometric model of a body part of a user, according to an embodiment of the disclosure.

FIG. 2 is a flow chart illustrating a method for generating a 3D biometric model of a user's body part, according to an embodiment of the disclosure.

Figure 12:
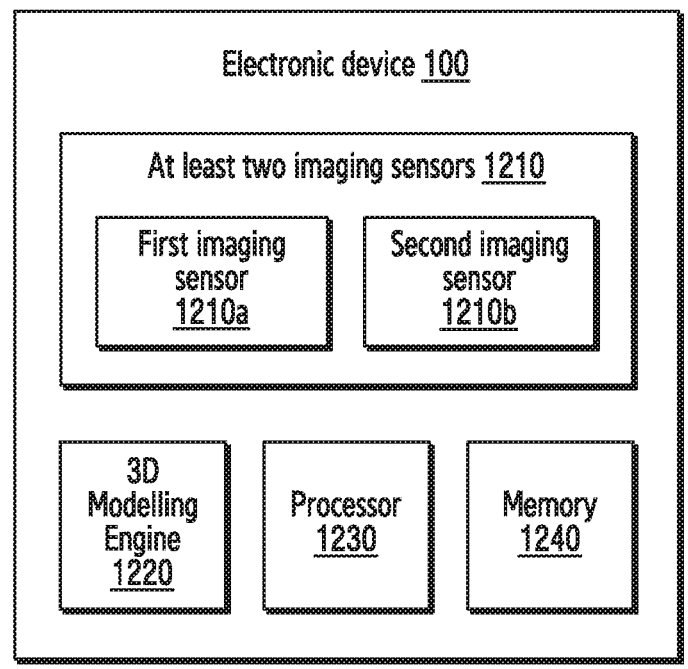
FIG. 12 is a block diagram illustrating various hardware elements of an electronic device for generating a 3D biometric model of a user's body part, according to an embodiment of the disclosure.

Referring to the FIG. 2, at operation 202, the electronic device 100 detects the body part of the user. For example, in the electronic device 100 as illustrated in FIG. 12, the at least two imaging sensors 110a and 110b can be configured to detect the body part of the user.

At operation 204, the electronic device 100 illuminates the first portion of the body part. For example, in the electronic device 100 as illustrated in FIG. 12, the second imaging sensor 110b can be configured to illuminate the first portion of the body part.

At operation 206, the electronic device 100 captures the first image of the first portion of the body part. For example, in the electronic device 100 as illustrated in FIG. 12, the first imaging sensor 110a can be configured to capture the first image of the first portion of the body part.

At operation 208, the electronic device 100 detects a sliding movement of the body part. For example, in the electronic device 100 as illustrated in the FIG. 12, the at least two imaging sensors 110a and 110b can be configured to detect a sliding movement of the body part.

At operation 210, the electronic device 100 illuminates the second portion of the body part. For example, in the electronic device 100 as illustrated in FIG. 12, the first imaging sensor 110a can be configured to illuminate the second portion of the body part.

At operation 212, the electronic device 100 captures the second image of the second portion of the body part. For example, in the electronic device 100 as illustrated in FIG. 12, the second imaging sensor 110b can be configured to capture the second image of the second portion of the body part.

At operation 214, the electronic device 100 generates the 3D biometric model of the body part using the first image and the second image of the body part. For example, in the electronic device 100 as illustrated in FIG. 12, the 3D modeling engine 1120 can be configured to dynamically generate the 3D model of the body part using the first image and the second image of the body part.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

FIGS. 3A, 3B, 3C, and 3D are examples illustrating a FOV of at least two imaging sensors of an electronic device, according to various embodiments of the disclosure.

Referring to FIGS. 3A-3D, the electronic device 100 has two imaging sensors 110a and 110b. In order to capture the first image and the second image of the finger of the user, the electronic device 100 initially determines whether the finger of the user is placed such that the finger covers the first imaging sensor 110a and the second imaging sensor 110b completely. The electronic device 100 determines whether the finger of the user completely covers the two imaging sensors 110a and 110b by using variants of proximity sensors and advanced image processing techniques.

The proposed method includes determining whether the first imaging sensor 110a and the second imaging sensor 110b have captured the same portion of the finger of the user by determining the overlapping portions in the first image and the second image (i.e., the overlapping portions of the finger vein structure in the first image and the second image). The same portion of the finger vein structure can be captured in consecutive frames by the first imaging sensor 110a and the second imaging sensor 110b or in subsequent frames by capturing a delayed video of the finger. In case of the delayed video of the finger, the video frames comprising the same portion of the finger of the user may appear after certain time delay and may not appear in the consecutive video frames. The distance between the first imaging sensor 110a and the second imaging sensor 110b determines whether the same portion of the finger can be captured in consecutive video frames or the delayed video of the finger needs to be captured.

Figure 3A:
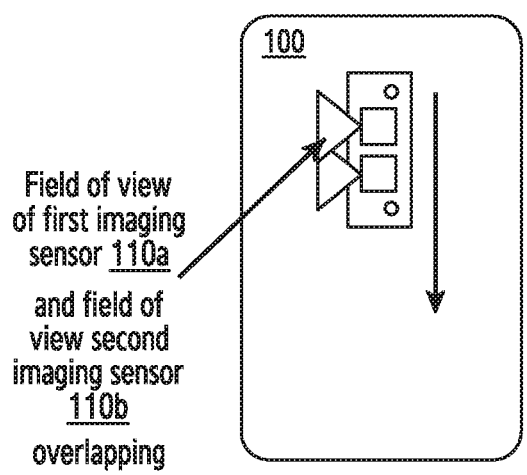
FIGS. 3A, 3B, 3C, and 3D are examples illustrating a field of view (FOV) of at least two imaging sensors of an electronic device, according to various embodiments of the disclosure.
Figure 3B:
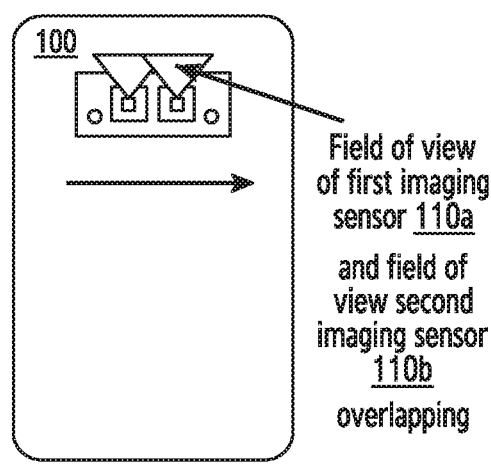
Figure 3C:
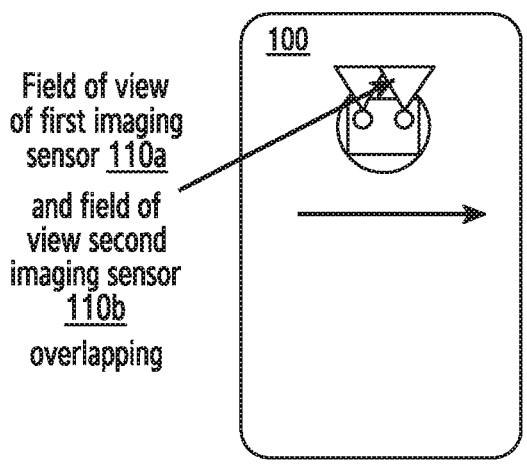

In FIGS. 3A-3D, the FOV of the first imaging sensor 110a and the second imaging sensor 110b are cone shaped and the fields of view originate at the center of the first imaging sensor 110a and the second imaging sensor 110b respectively. If the cones of the first imaging sensor 110a and the second imaging sensor 110b do not intersect each other within the finger, then the first imaging sensor 110a and the second imaging sensor 110b are not imaging the same portion of the finger simultaneously. Further, the intersection of the FOV depends on the distance between the first imaging sensor 110a and the second imaging sensor 110b. In general, the inter-imaging sensor distances are in the range of 0.8 cm to 2.5 cm. The first imaging sensor 110a and the second imaging sensor 110b with shorter inter-imaging sensor distances capture the same portion of the finger in the consecutive frames since the fields of view of the first imaging sensor 110a and the second imaging sensor 110b overlaps, as shown in FIGS. 3A-3C.

Figure 3D:
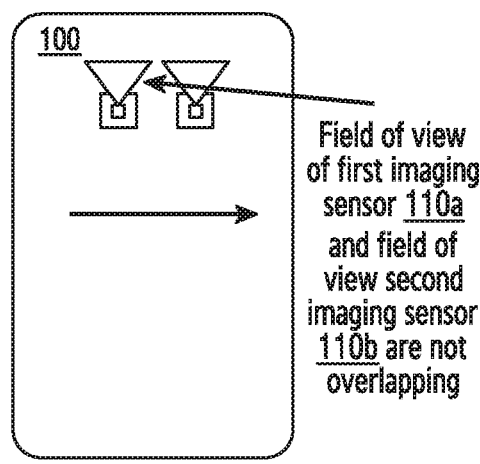

The first imaging sensor 110a and the second imaging sensor 110b with longer inter-imaging sensor distances require the delayed video to capture the same portion of the finger, since the FOV of the first imaging sensor 110a and the FOV of the second imaging sensor 110b does not overlap at the given instant of time, as shown in FIG. 3D. Accordingly, the stereo video of the finger vein structure has to be captured to be able to generate the 3D biometric model of the finger vein structure.

Figure 4A:
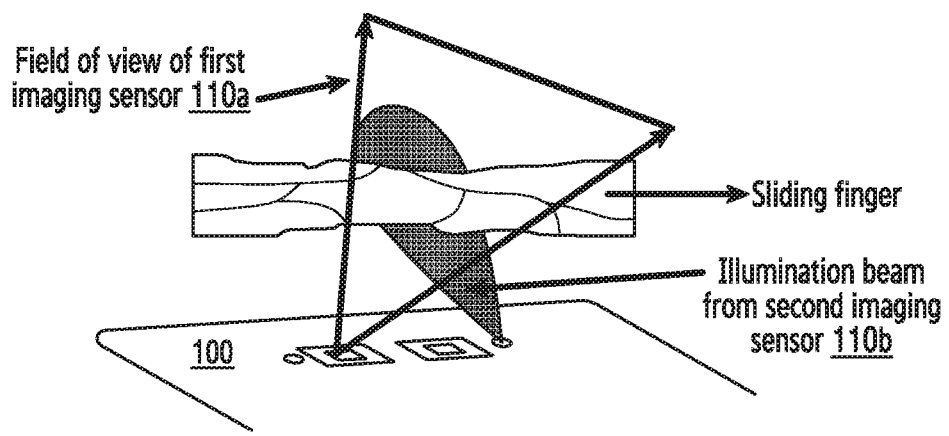
FIGS. 4A and 4B are example illustrations in which an electronic device generates a 3D biometric model of finger vein structure of the user, according to various embodiments of the disclosure.
Figure 4B:
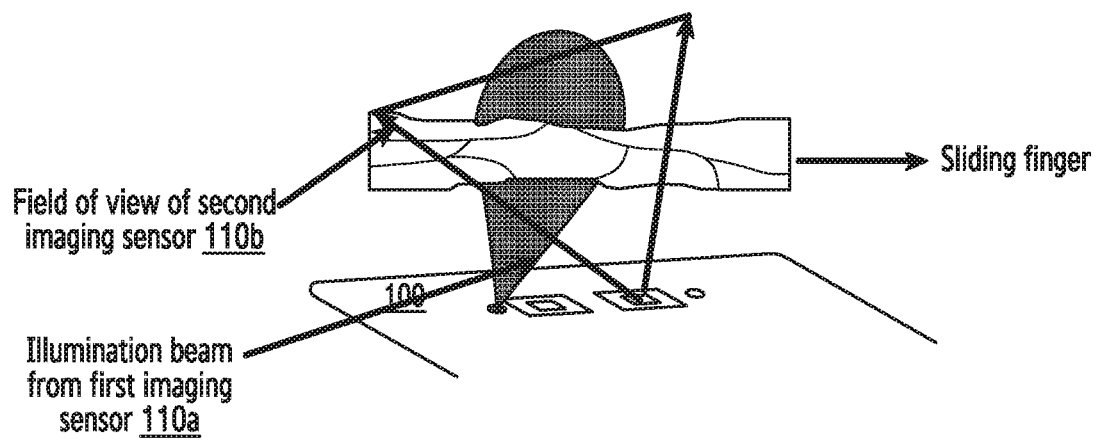

FIGS. 4A and 4B are illustrations in which an electronic device generates a 3D biometric model of a finger vein structure of a user, according to various embodiments of the disclosure.

Referring to FIGS. 4A and 4B, finger veins are sub-dermal (i.e., the finger veins are located below the skin) and have a three-dimensional structure. The finger vein structure is unique for every user and hence can be used as a biometric in various applications. Since the finger veins are located deep within the user's finger, the finger vein structure cannot be replicated and is thus spoof free. Also, since the finger vein structures are sub-dermal, related art techniques for capturing the structure require complex structures. However, the proposed method uses the electronic device including the at least two imaging sensors to capture the finger vein structures. The proposed method includes illuminating the finger with an infrared light beam. The infrared light beam travels through the finger and highlights the vein pattern within the finger of the user. The finger vein structure is then captured as an image using the at least two imaging sensors. The finger vein structure has lower false rejection rate (FRR) and lower false acceptance rate (FAR) as compared to traditional biometrics due to the sub-dermal feature. Further, the finger vein structure is not affected by weather or age related effects on the skin surface.

Referring to FIG. 4A, the electronic device 100 determines that the user has placed the finger on the first imaging sensor 110a and the second imaging sensor 110b such that the finger covers the first imaging sensor 110a and the second imaging sensor 110b completely. The illuminating sensor 114b of the second imaging sensor 110b and the image capturing sensor 112a of the first imaging sensor 110a are activated simultaneously. The first imaging sensor 110a captures the first image which includes the first portion of the finger which is within the FOV of the first imaging sensor 110a and illuminated by the second imaging sensor 110b, as shown in FIG. 4A. The electronic device 100 then detects a sliding motion of the finger on the first imaging sensor 110a and the second imaging sensor 110b in the direction as indicated in FIG. 4A.

The illuminating sensor 114a of the first imaging sensor 110a and the image capturing sensor 112b of the second imaging sensor 110b are activated simultaneously. The second imaging sensor 110b captures the second image which includes the second portion of the finger which is within the FOV of the second imaging sensor 110b and illuminated by the first imaging sensor 110a, as shown in FIG. 4B. The electronic device 100 determines whether at least one location of the first portion in the first image of the finger overlaps with the second portion in the second image of the finger of the user at the given instant of time. According to determining that the at least one location of the first portion in the first image of the finger overlaps the second portion in the second image of the finger, the electronic device 100 uses the first image and the second image to generate the 3D biometric model of the finger vein structure of the user.

Upon determining that the at least one location of the first portion in the first image of the finger does not overlap with the second portion in the second image of the finger at the given instant of time, the electronic device 100 records a video of the finger of the user by sliding the finger along the first imaging sensor 110*a* and the second imaging sensor 110*b*, in the direction as indicated in FIGS. 4A and 4B. The images or frames capturing the same region of the finger may be captured at a later period of time in the video. For example, a portion of the finger may be captured in the first frame of the video by the first imaging sensor 110*a*. The user performs the sliding movement of the finger so that the same portion of the finger moves into the FOV of the second imaging sensor 110*b*. Accordingly, the same portion of the finger is again captured in the $20^{th}$ frame of the video which appears after a time delay. The video is then used to determine the first frame and the $20^{th}$ frame which have captured the same portion of the finger. The first frame and the $20^{th}$ frame of the video are also used to create the depth map of the finger vein structure, which is then used to generate the 3D biometric model of the user's finger vein structure.

Figure 5:
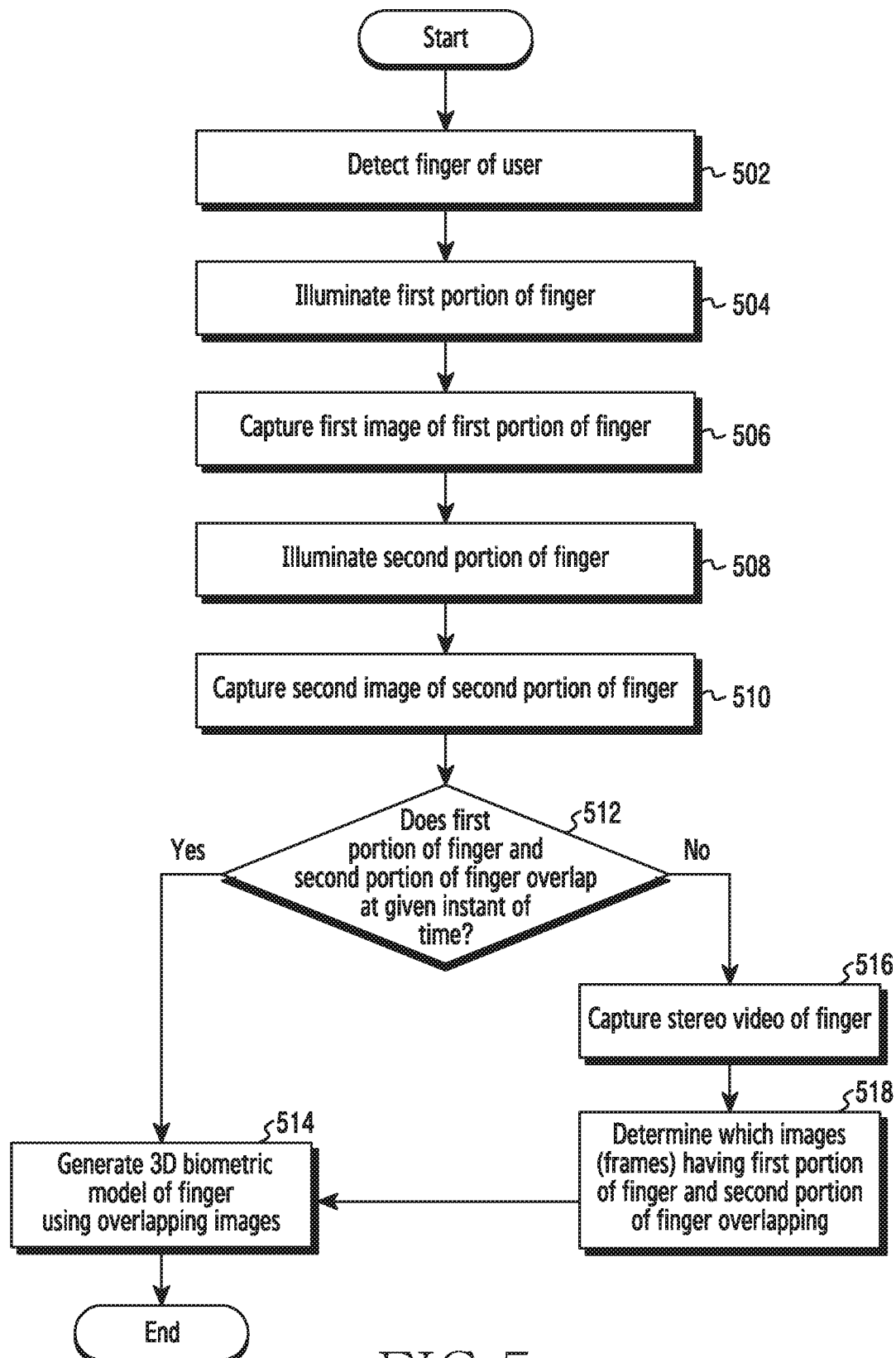
FIG. 5 is a flow chart illustrating a method for generating a 3D biometric model of a finger vein structure of a user, according to an embodiment of the disclosure.

FIG. 5 is a flow chart illustrating a method for generating a 3D biometric model of a user's finger vein structure, according to an embodiment of the disclosure.

Referring to FIG. 5, at operation 502, the electronic device 100 detects the finger of the user. For example, in the electronic device 100 as illustrated in FIG. 12, the at least two imaging sensors 110*a* and 110*b* can be configured to detect the user's finger.

At operation 504, the electronic device 100 illuminates the first portion of the finger. For example, in the electronic device 100 as illustrated in FIG. 12, the second imaging sensor 110*b* can be configured to illuminate the first portion of the finger.

At operation 506, the electronic device 100 captures the first image of the first portion of the finger. For example, in the electronic device 100 as illustrated in FIG. 12, the first imaging sensor 110*a* can be configured to capture the first image of the first portion of the finger.

At operation 508, the electronic device 100 illuminates the second portion of the finger. For example, in the electronic device 100 as illustrated in FIG. 12, the first imaging sensor 110*a* can be configured to illuminate the second portion of the finger.

At operation 510, the electronic device 100 captures the second image of the second portion of the finger. For example, in the electronic device 100 as illustrated in FIG. 12, the second imaging sensor 110*b* can be configured to capture the second image of the second portion of the finger.

At operation 512, the electronic device 100 determines whether the first portion of finger and the second portion of finger overlap at the given instant of time. For example, in the electronic device 100 as illustrated in FIG. 12, the 3D modeling engine 1120 can be configured to determine whether first portion of finger and second portion of finger overlap at the given instant of time.

Upon determining that the first portion of the finger and the second portion of the finger overlap at the given instant of time, at operation 514, the electronic device 100 generates the 3D biometric model of the finger vein structure. For example, in the electronic device 100 as illustrated in FIG. 12, the 3D modeling engine 1120 can be configured to dynamically generate the 3D biometric model of the finger vein structure.

Upon determining that the first portion of the finger and the second portion of the finger do not overlap at the given instant of time, at operation 516, the electronic device 100 captures the stereo video of the finger. For example, in the electronic device 100 as illustrated in FIG. 12, the at least two imaging sensors 110*a* and 110*b* can be configured to capture the stereo video of the finger. The stereo video includes a plurality of images (frames) of the finger which captures the finger vein structure. The first portion of the finger and the second portion of the finger will overlap at a later point of time in one of the subsequent images (frames) of the stereo video.

At operation 518, the electronic device 100 determines the images (frames) from the stereo video having the first portion of the finger and the second portion of the finger overlapping. For example, in the electronic device 100 as illustrated in FIG. 12, the 3D modeling engine 1120 can be configured to determine the images (frames) from the stereo video having the first portion of the finger and the second portion of the finger overlapping. The electronic device 100 loops to operation 514 and dynamically generates the 3D biometric model of the finger vein structure using the images from the stereo video which have the first portion of the finger and the second portion of the finger overlapping.

Figure 6:
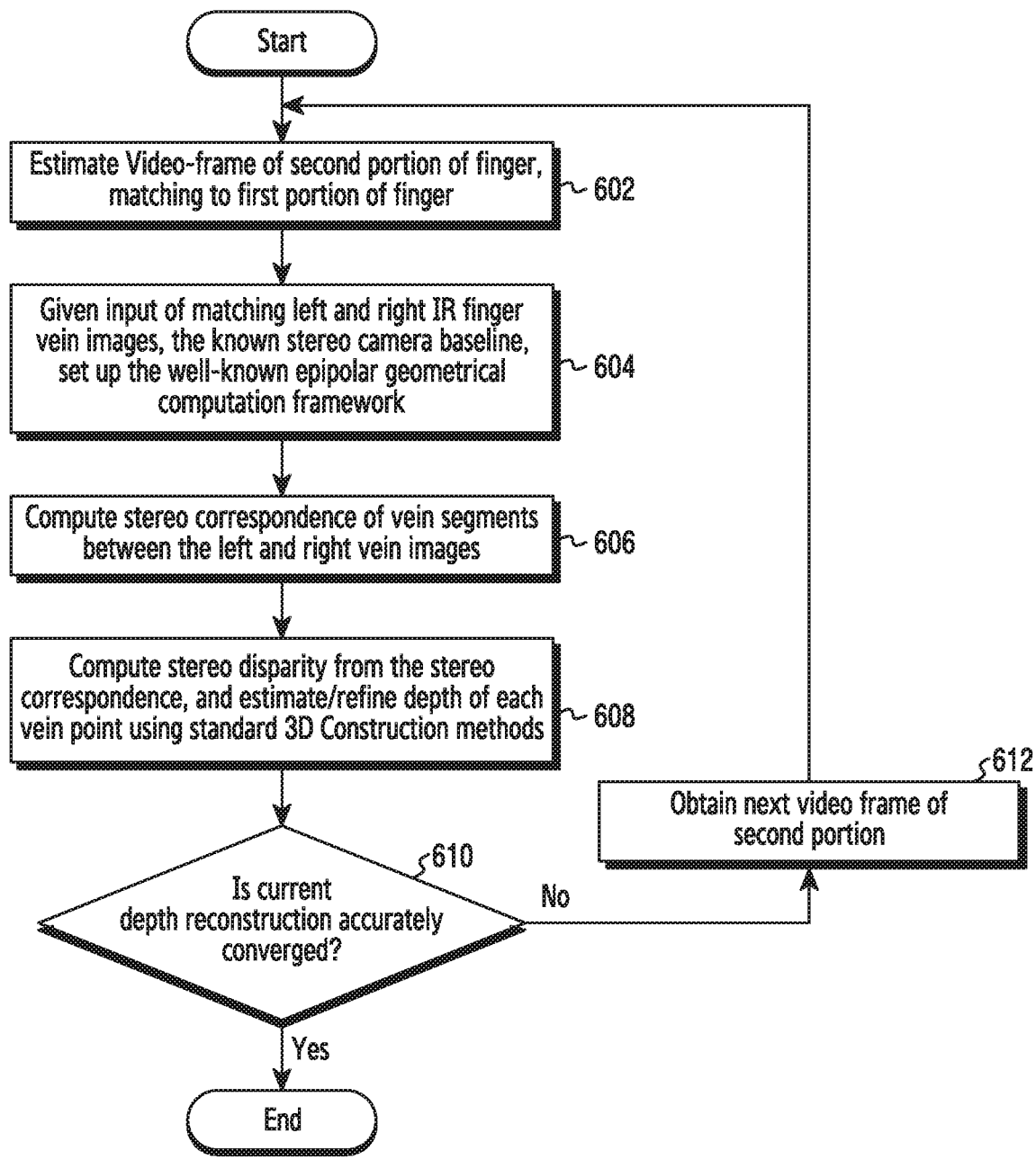
FIG. 6 is a flow chart illustrating a method for generating a 3D biometric model of a finger using images, according to an embodiment of the disclosure.

FIG. 6 is a flow chart illustrating a method for generating a 3D biometric model of a finger using images, according to an embodiment of the disclosure.

Referring to FIG. 6, at operation 602, the electronic device 100 estimates a video-frame of a second portion of a finger, matching to a first portion of the finger. If no overlap, the electronic device 100 estimates based on a stereo camera baseline, a frame-rate, and a sliding finger speed estimated from a touchscreen speed or a camera Image speed of the finger, and so on.

At operation 604, the electronic device 100, given an input of matching left and right infrared (IR) finger vein images, the known stereo camera baseline, sets up a well-known epipolar geometrical computation framework. At operation 606, the electronic device 100 computes a stereo correspondence of vein segments between the left and right vein images.

Then, at operation 608, the electronic device 100 computes a stereo disparity from the stereo correspondence, and estimates or refines a depth of each vein point using standard 3D construction methods. At operation 610, the electronic device 100 determines whether a current depth reconstruction is accurately converged. When a vein axis is parallel to the stereo camera baseline, it will be difficult to estimate its depth with just one stereo image pair. As doing more iterations, the two ends of the vein segment will be revealed, thus increasing accuracy.

If the current depth reconstruction is not accurately converged, at operation 612, the electronic device 100 obtains a next video frame of the second portion. Then, the electronic device 100 returns to the operation 602.

The entire reconstruction procedure as shown at FIG. 6 is now repeated (as many times as camera view will permit) for the same left image and shifted right images which correspond to a slightly changed stereo baseline. Because each vein part's depth is estimated from different effective stereo baseline distance, a more accurate estimation of depth of the vein part is obtained. Also, when a vein axis is parallel to stereo baseline, it will be difficult to estimate its depth profile with just one stereo image pair. As doing more iterations, the two ends of the parallel vein segment will be revealed, from which the veins depth profile can be computed more inferred.

A procedure described at FIG. 6 is performed completely for an image of a first portion of the finger. To generating or constructing a 3D biometric model of the complete finger vein structure, the procedure described at FIG. 6 may be repeatedly performed on other first portions of the finger in the video by shifting the first portion. That is, all operations at FIG. 6 are repeated about a next image of another first portion of the finger, until an entire finger is completed. If the finger is completed, the 3D biometric model is generated.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

Embodiments as aforementioned, at least two imaging sensors (e.g., imaging sensors 110a and 110b) are utilized. In another embodiment, a single imaging sensor may be utilized to generate a 3D biometric model of the finger vein structure. Herein, the single imaging sensor includes an image capturing sensor and at least two illuminating sensors. The at least two illuminating sensors are arranged around the image capturing sensor. The at least two illuminating sensors are arranged at different locations, as shown in FIGS. 7A and 7B.

Figure 7A:
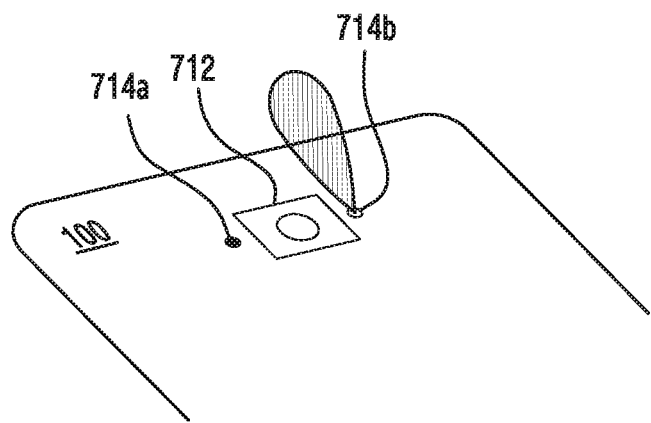
FIGS. 7A and 7B are example illustrations in which an electronic device generates a 3D biometric model of a finger vein structure of a user, according to various embodiments of the disclosure.
Figure 7B:
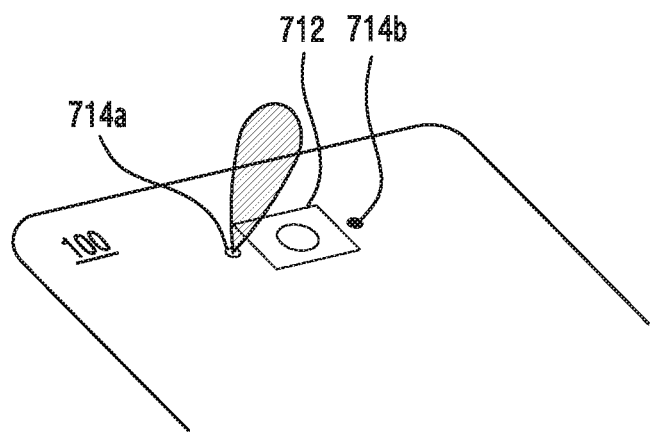

FIGS. 7A and 7B are another example illustrations in which an electronic device generates a 3D biometric model of a user's finger vein structure, according to various embodiments of the disclosure.

Referring to FIGS. 7A and 7B, a first illuminating sensor 714a is arranged at left side of an image capturing sensor 712, and a second illuminating sensor 714b is arranged at right side of an image capturing sensor 712. When a user places a finger on the image capturing sensor 712, the second illuminating sensor 714b is activated and the image capturing sensor 712 is controlled to capture a first image as shown in FIG. 7A. While the finger is placed on the image capturing sensor 712, the first illuminating sensor 714a is activated and the image capturing sensor 712 is controlled to capture a second image as shown in FIG. 7B. Due to a difference between locations of the first illuminating sensor 714a and the second illuminating sensor 714b, the first image and the second image include different images of the same portion of the finger.

In various embodiments, a user interface (UI) for guiding a user in order to place the user's finger at proper location to capture images. An example of the UI is shown in FIG. 8.

Figure 8:
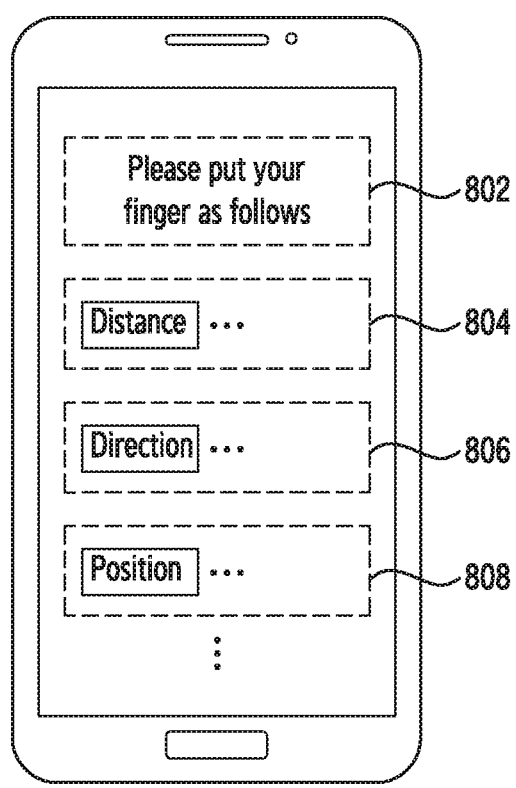
FIG. 8 is an example illustration of a user interface (UI) displayed in an electronic device according to an embodiment of the disclosure.

FIG. 8 is an example illustration of a UI displayed in an electronic device according to an embodiment of the disclosure.

Referring FIG. 8, the electronic device 100 displays the UI for guiding the user. The UI includes at least one of a title item 802, a first guide item 804 regarding to a distance between a finger and an image sensor, a second guide item 806 regarding to a slide direction (i.e., 'left to right', 'right to left' and so on), and a third guide item 808 regarding to a position of the finger to be captured. In various embodiments, at least one of the items 802, 804, 806 and 808 may be text, images or moving images.

Figure 9A:
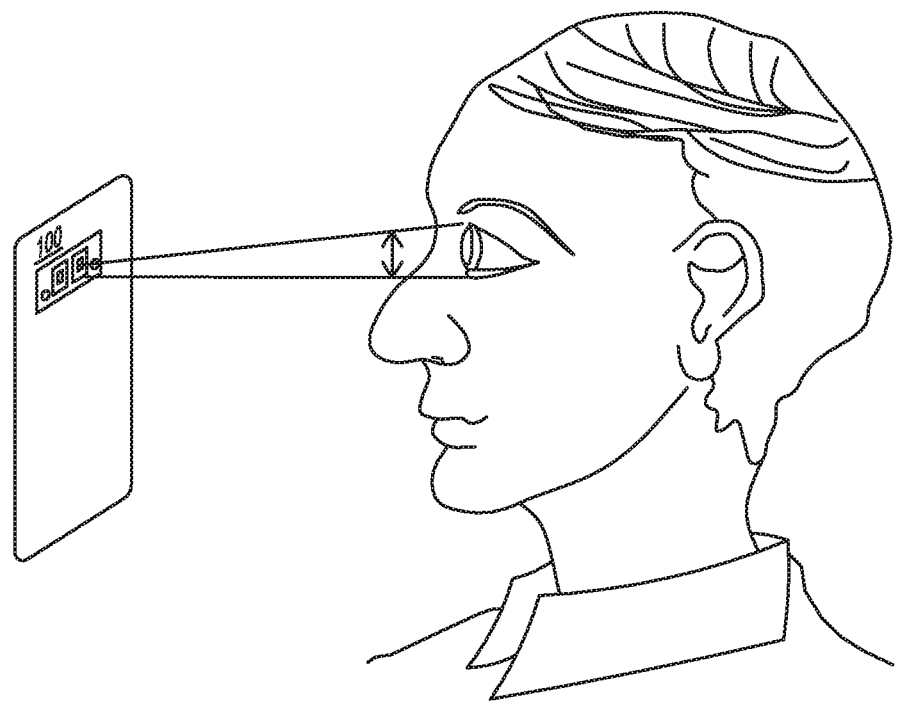
FIGS. 9A and 9B are example illustrations in which an electronic device generates a 3D biometric model of an iris of a user, according to various embodiments of the disclosure.
Figure 9B:
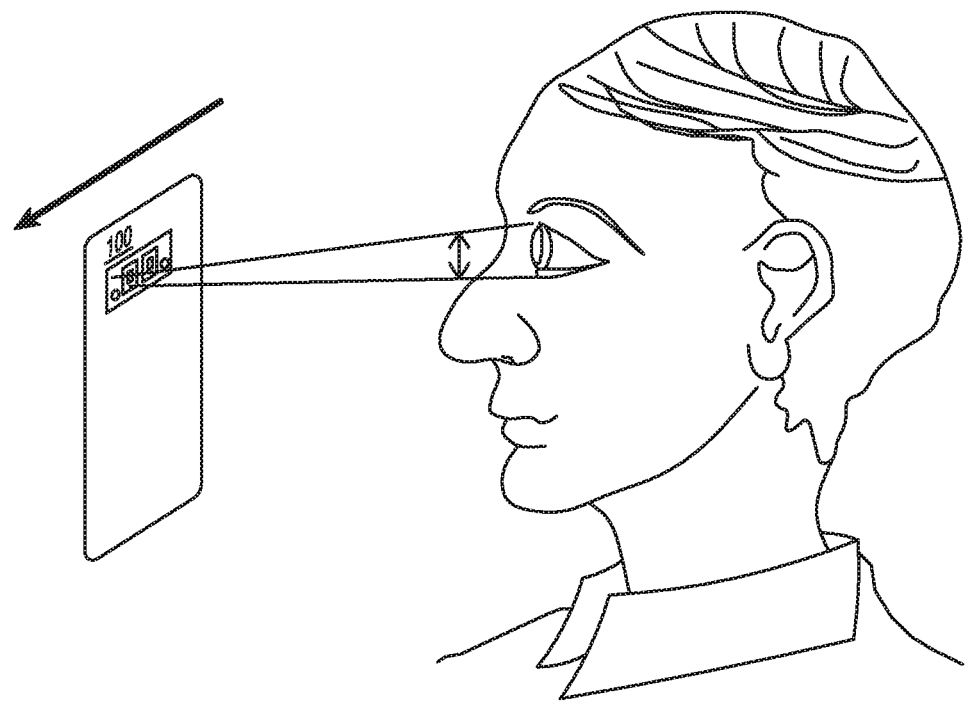

FIGS. 9A and 9B are example scenarios illustrating an electronic device generating a 3D biometric model of a user's iris, according to various embodiments of the disclosure.

Referring to FIGS. 9A and 9B, the iris is a structure in the eyes that is an intricately woven web of blood vessels and cells. The iris is formed at the early stages of an individual's life and the texture remains stable during the lifetime of the individual. Further, even genetically identical individuals have distinct iris textures which make the use of iris for authentication purposes highly accurate and reliable. The iris has complex patterns that are unique for every user. Iris recognition uses video camera technology with subtle near infrared illumination to acquire images of the detail-rich, intricate structures of the iris which are visible externally according to the related art.

As shown in FIGS. 9A and 9B, the electronic device 100 has the first imaging sensor 110a and the second imaging sensor 110b.

Referring to FIGS. 9A and 9B, the electronic device 100 is placed in front of the eyes of the user such that the iris is within the FOV of the first imaging sensor 110a of the electronic device 100. The iris is illuminated by the second imaging sensor 110b of the electronic device 100 and the first imaging sensor 110a captures the first image of the iris of the eye. The iris is illuminated by the first imaging sensor 110a and the second imaging sensor 110b captures the second image of the iris of the eye.

The first image and the second image of the iris are registered (i.e., image registration is performed). A difference between the first image and the second image of the iris is determined. The difference value between the first image and the second image of the iris provides an indication of the 3D structure of the iris.

The electronic device 100 is moved across the user's face (as shown in FIG. 9B) to bring the iris into the FOV of the second imaging sensor 110b of the electronic device 100 to obtain an alternating stereo video of the iris. The alternating stereo video is captured with high frame rate to avoid flicker issues. The alternating stereo video is captured using the cross-paired setup where the first imaging sensor 110a of the at least two imaging sensors 110a and 110b is used to illuminate the iris while the second imaging sensor 110b is used to capture the image of the iris. The second imaging sensor 110b of the at least two imaging sensors 110a and 110b are used to illuminate the iris while the first imaging sensor 110a is used to capture the image of the iris. The 3D biometric model of the iris is generated using the difference between multiple images (frames) obtained in the stereo video of the iris. The 3D biometric model of the iris can be used for spoof free biometric authentication of the user. The main advantage of using iris for authentication is the speed of matching and the resistance to false matches.

Figure 10:
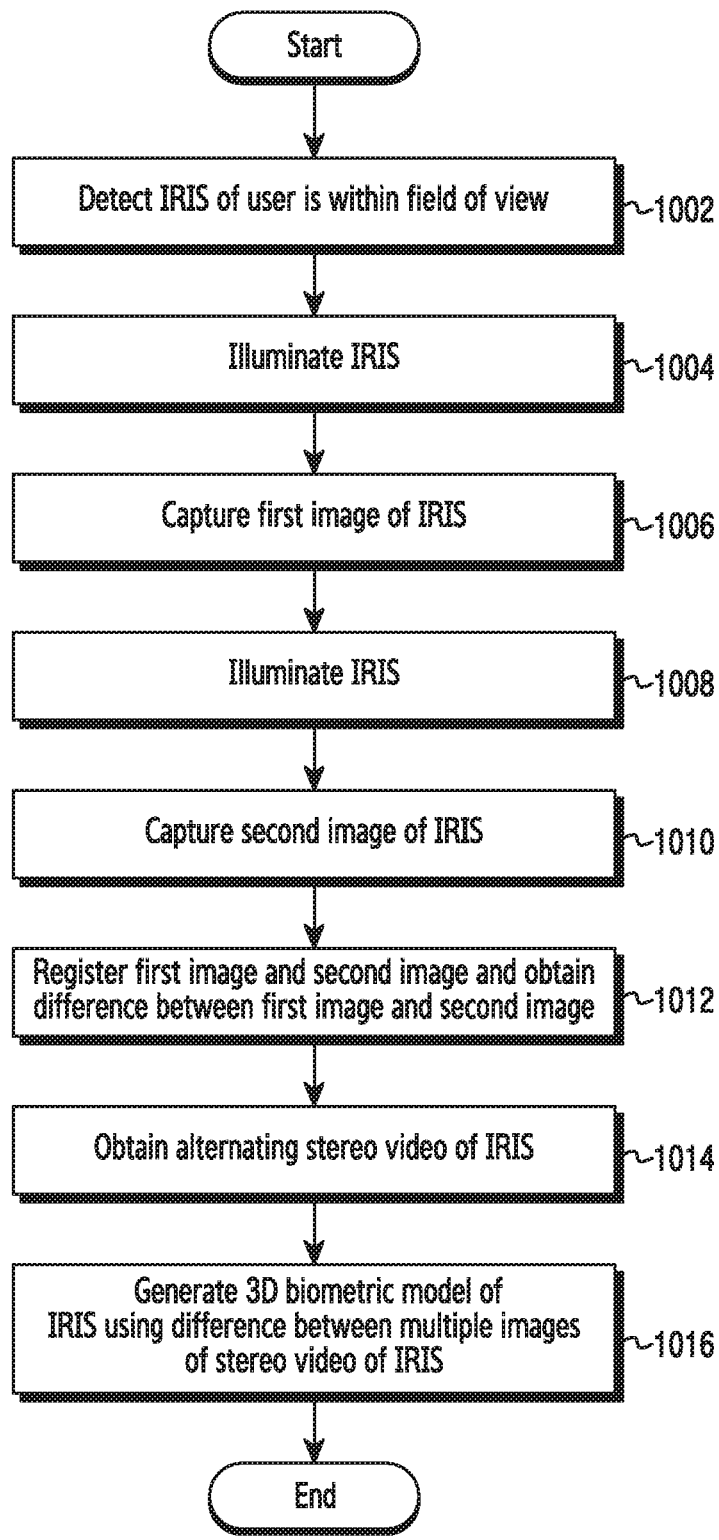
FIG. 10 is a flow chart illustrating a method for generating a 3D biometric model of an iris of a user, according to an embodiment of the disclosure.

FIG. 10 is a flow chart illustrating a method for generating a 3D biometric model of a user's iris, according to an embodiment of the disclosure.

Referring to FIG. 10, at operation 1002, the electronic device 100 detects the user's iris within the FOV. For example, in the electronic device 100 as illustrated in FIG. 12, the at least two imaging sensors 1210a and 1210b can be configured to detect that the iris of the user is within the FOV.

At operation 1004, the electronic device 100 illuminates the iris. For example, in the electronic device 100 as illustrated in FIG. 12, the second imaging sensor 110b can be configured to illuminate the iris.

At operation 1006, the electronic device 100 captures the first image of the iris. For example, in the electronic device 100 as illustrated in FIG. 12, the first imaging sensor 1210a can be configured to capture the first image of the iris.

At operation 1008, the electronic device 100 illuminates the iris. For example, in the electronic device 100 as illustrated in FIG. 12, the first imaging sensor 110a can be configured to illuminate the iris.

At operation 1010, the electronic device 100 captures the second image of the iris. For example, in the electronic device 100 as illustrated in FIG. 12, the second imaging sensor 1210b can be configured to capture the second image of the iris.

At operation 1012, the electronic device 100 registers the first image and the second image and obtains the difference between the first image and the second image. For example, in the electronic device 100 as illustrated in the FIG. 12, the 3D modeling engine 1220 can be configured to register the first image and the second image and obtain the difference between the first image and the second image.

At operation 1014, the electronic device 100 obtains an alternating stereo video of the iris. For example, in the electronic device 100 as illustrated in FIG. 12, the at least two imaging sensors 1210a and 1210b can be configured to obtain the alternating stereo video of the iris.

At operation 1016, the electronic device 100 generates the 3D biometric model of the iris using the difference between multiple images of the stereo video of the iris. For example, in the electronic device 100 as illustrated in FIG. 12, the 3D modeling engine 1220 can be configured to dynamically generate the 3D biometric model of the iris using the difference between multiple images of the stereo video of the iris.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

Figure 11:
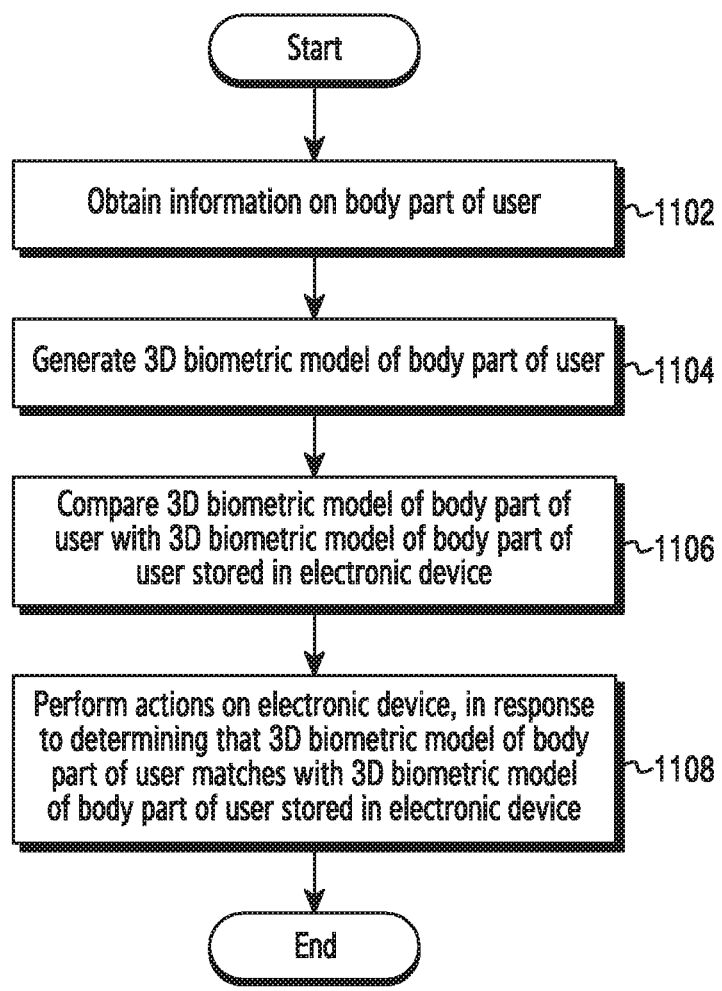
FIG. 11 is a flow chart illustrating a method for performing actions based on a 3D biometric model of the body part of the user, according to an embodiment of the disclosure.

FIG. 11 is a flow chart illustrating a method for performing actions based on a 3D biometric model of a user's body part, according to an embodiment of the disclosure.

Referring to FIG. 11, at operation 1102, the electronic device 100 obtains information on the user's body part. For example, in the electronic device 100 as illustrated in FIG. 12, the at least two imaging sensors 1210a and 1210b can be configured to obtain the information on the body part of the user.

At operation 1104, the electronic device 100 generates the 3D biometric model of the user's body part. For example, in the electronic device 100 as illustrated in FIG. 12, the 3D modeling engine 1220 can be configured to generate the 3D biometric model of the body part of the user.

At operation 1106, the electronic device 100 compares the 3D biometric model of the user's body part with the 3D biometric model of the user's body part that is already stored in the electronic device 100. For example, in the electronic device 100 as illustrated in FIG. 12, the 3D modeling engine 1220 can be configured to compare the 3D biometric model of the body part of the user with the 3D biometric model of the body part of user which is already stored in the electronic device 100.

At operation 1108, the electronic device 100 performs actions in response to determining that the 3D biometric model of the user's body part matches the 3D biometric model of the user's body part stored in the electronic device 100. For example, in the electronic device 100 as illustrated in the FIG. 12, the 3D modeling engine 1220 can be configured to perform actions in response to determining that the 3D biometric model of the user's body part matches the 3D biometric model of the user's body part stored in the electronic device 100.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

FIG. 12 is a block diagram illustrating various hardware elements of an electronic device for generating a 3D biometric model of a user's body part, according to an embodiment of the disclosure.

Referring to FIG. 12, the electronic device 100 can be, for example, a mobile phone, a smart phone, personal digital assistants (PDAs), a tablet, a wearable device, display devices, Internet of things (IoT) devices, electronic circuit, chipset, and electrical circuit (i.e., system on chip (SoC)), etc.

Referring to FIG. 12, the electronic device 100 can include at least one imaging sensor 1210, a 3D modeling engine 1220, a processor 1230, and a memory 1240.

The at least two imaging sensors 1210 includes a first imaging sensor 1210a and a second imaging sensor 1210b. Each of the imaging sensors is a pair of an image capturing sensor (e.g., camera) and an illuminating sensor (e.g., light emitting diode (LED)). The at least two imaging sensors 1210a and 1210b emits light that is capable of penetrating through skin and illuminate the user's body part of the user (e.g., near infrared light). In another embodiment, instead of the at least two imaging sensors 1210, a single imaging sensor may be included. The single imaging sensor includes an image capturing sensor and at least two illuminating sensors that are arranged around the image capturing sensor.

The at least two imaging sensors 1210a and 1210b are configured to detect that the body part of the user is within the FOV of the at least two imaging sensors 1210. The at least two imaging sensors 1210a and 1210b detects the body part is within the FOV of the at least two imaging sensors 1210a and 1210b based on various proximity sensors, advanced image processing techniques, light sensors and the like.

The at least two imaging sensors 1210a and 1210b are also configured to automatically capture the first image of the first portion of the body part and the second image of the second portion of the body part of the user. The first image of the first portion of the body part and the second image of the second portion of the body part are captured by alternating the crossed-pair of the at least two imaging sensors 1210. The alternating crossed-pairing of the first imaging sensor 1210a and the second imaging sensor 1210b can be done manually by the user. The first image of the first portion of the body part includes a subcutaneous pattern/structure at a first location of the body part. The second image of the second portion of the body part includes a subcutaneous pattern/structure at a second location of the body part.

The at least two imaging sensors 1210a and 1210b is also configured to record the delayed stereo video of the body part by sliding the body part across the at least two imaging sensors 1210, when the 3D modeling engine 1220 determines that the first portion of the first image of the body part and the second portion of the second image of the body part do not overlap at the given instant of time. The delayed stereo video of the body part includes continuously capturing the subcutaneous pattern/structure of the body part in the subsequent frames of the video.

In another embodiment, the at least two imaging sensors 1210a and 1210b are configured to capture the delayed stereo video of the body part by moving the electronic device 100 across the user's body part (e.g., the iris). In such cases, the frame rate is maintained at a specific level to avoid flicker issues.

The 3D modeling engine 1220 may be configured to compare the first image of the body part and the second image of the body part based on image similarity techniques to determine whether the first portion of the first image of the body part and the second portion of the second image of the body part overlaps. The 3D modeling engine 1220 may be configured to generate the 3D biometric model of the body part on determining that the first portion of the first image of the body part and the second portion of the second image of the body part overlaps at the given instant of time. The first portion of the first image of the body part and the second portion of the second image of the body part overlaps when the first image and the second image have captured the same portion of the body part of the user.

Upon determining that the first portion of the first image of the body part and the second portion of the second image of the body part do not overlap, the 3D modeling engine 1220 is configured to trigger the at least two imaging sensors 1210a and 1210b to record the delayed video of the body part of the user by sliding the body part across the at least two imaging sensors 120. The 3D modeling engine 1220 may be configured to determine the images (i.e., video frames) in the video which have the same portion of the body part of the user and use the images to generate the 3D biometric model of the body part of the user.

In another embodiment, the 3D modeling engine 1220 may be configured to register the first image and the second image of the body part of the user and obtain the difference between the first image and the second image. The 3D modeling engine 1220 may also be configured to obtain an alternating stereo video of the body part of the user. The 3D modeling engine 1220 may also be configured to determine the difference between the multiple images of the stereo video of the body part and dynamically generate the 3D biometric model of the body part using the difference between multiple images. The 3D modeling engine 1220 may also be configured to retrieve the 3D biometric model of the body part which is stored in the memory 1240 and compare the retrieved the 3D biometric model of the body part with a current 3D biometric model of the body part to perform actions on the electronic device. The actions can be associated with authentication and access control applications such as at least one of locking the electronic device, unlocking the electronic device, locking an application in the electronic device, unlocking an application in the electronic device, etc.

The processor 1230 can be configured to interact with the hardware elements such as the at least one imaging sensor 1210, the 3D modeling engine 1220, and the memory 1240 for generating the 3D biometric model of the body part of the user. The processor 1230 may include one or more processors configured to control various components of the electronic device 100.

The memory 1140 may be configured to store the 3D biometric model of the body part generated by the 3D modeling engine 1220. The 3D biometric model of the body part which is stored in the memory 1240 is retrieved and compared with a current 3D biometric model of the body part generated by the 3D modeling engine 1220 for various authentication and access control applications. The memory 1240 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 140 may, in some examples, be considered a non-transitory storage medium. The term "non-transitory" may indicate that the storage medium is not embodied in a carrier wave or a propagated signal. However, the term "non-transitory" should not be interpreted that the memory 1240 is non-movable. In some examples, the memory 1240 can be configured to store larger amounts of information than the memory. In certain examples, a non-transitory storage medium may store data that can, over time, change (e.g., in random access memory (RAM) or cache).

In another embodiment, the electronic device 100 can include a display (not shown). The display is used to display a user interface (e.g., the user interface as shown at FIG. 8).

Although FIG. 12 shows the hardware elements of the electronic device 100, it is to be understood that other embodiments are not limited thereon. In other embodiments, the electronic device 100 may include a larger or smaller number of elements. Further, the labels or names of the elements are used only for illustrative purpose and does not limit the scope of the disclosure. One or more components can be combined together to perform same or substantially similar function for generating the 3D biometric model of the body part of the user using an electronic device 100.

The embodiments disclosed herein can be implemented using at least one software program running on at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for generating a three-dimensional (3D) biometric model of a body part of a user using an electronic device, the method comprising:
   detecting, by using at least one imaging sensor of the electronic device, the body part;
   capturing, by using the at least one imaging sensor, a first image of a first portion of the body part and a second image of a second portion of the body part;
   generating, based on determining that the first portion and the second portion are of a same body part, the 3D biometric model of the body part using the first image and the second image of the body part; and
   storing the 3D biometric model of the body part in the electronic device.

2. The method of claim 1, further comprising:
   obtaining information on the body part;
   generating the 3D biometric model of the body part;
   comparing the 3D biometric model of the body part with the stored 3D biometric model of the body part; and
   performing actions on the electronic device, in response to determining that the 3D biometric model of the body part matches the 3D biometric model of the body part stored in the electronic device.

3. The method of claim 2, wherein the actions comprise at least one of locking the electronic device, unlocking the electronic device, locking an application in the electronic device, or unlocking the application in the electronic device.

4. The method of claim 1, wherein the body part is within a field of view (FOV) of the at least one imaging sensor.

5. The method of claim 1, wherein the capturing of the first image of the first portion of the body part and the second image of the second portion of the body part comprises:
illuminating, by using a second imaging sensor of the at least one imaging sensor, the first portion of the body part;
capturing, by using the first imaging sensor of the at least one imaging sensor, the first image of the first portion of the body part;
detecting a sliding movement of the body part, wherein the body part is slid to bring the body part from a field of view (FOV) of the first imaging sensor into a FOV of the second imaging sensor;
illuminating, by using the first imaging sensor of the at least one imaging sensor, the second portion of the body part; and
capturing, by using the second imaging sensor of the at least one imaging sensor, the second image of the second portion of the body part.

6. The method of claim 1,
wherein the capturing of the first image of the first portion of the body part and the second image of the second portion of the body part comprises:
illuminating, by using a first illuminating sensor of the at least one imaging sensor, the first portion of the body part;
capturing, by using a capturing sensor of the at least one imaging sensor, the first image of the first portion of the body part;
illuminating, by using a second illuminating sensor of the at least one imaging sensor, the second portion of the body part; and
capturing, by using the capturing sensor of the at least one imaging sensor, the second image of the second portion of the body part, and
wherein the first illuminating sensor and the second illuminating sensor are arranged in different sides from the capturing sensor.

7. The method of claim 1,
wherein the generating of the 3D biometric model of the body part using the first image and the second image of the body part comprises:
determining whether at least one location of the first portion in the first image of the body part overlaps with the second portion in the second image of the body part at a given instant of time; and
performing one of:
generating the 3D biometric model of the body part using the first image and the second image of the body part, upon determining that the at least one location of the first portion in the first image of the body part overlaps the second portion in the second image of the body part at the given instant of time; or
generating the 3D biometric model of the body part by capturing a video of the body part by sliding the body part along at least two imaging sensors, upon determining that the at least one location of the first portion in the first image of the body part does not overlap the second portion in the second image of the body part at the given instant of time, and
wherein the first portion in the first image of the body part overlaps the second portion of the second image of the body part at a later time when the body part has slid at a determinable speed.

8. The method of claim 1, wherein the body part comprises one of a finger vein or an iris of the user.

9. The method of claim 1, further comprising:
displaying a user interface for providing the user with a guide for the body part,
wherein the user interface comprises at least one of a first guide item regarding a distance between the body part and the at least one image sensor, a second guide item regarding a slide direction, or a third guide item regarding a position of the body part to be captured.

10. An electronic device for generating a three-dimensional (3D) biometric model of a body part of a user, the electronic device comprising:
at least one processor coupled to a memory;
at least one imaging sensor coupled to the at least one processor, wherein the at least one imaging sensor is configured to:
detect the body part, and
capture a first image of a first portion of the body part and a second image of a second portion of the body part; and
a 3D modeling engine coupled to the at least one processor and the memory,
wherein the at least on processor is configured to control the 3D modeling engine to generate, based on determining that the first portion and the second portion are of a same body part, the 3D biometric model of the body part using the first image and the second image of the body part, and
wherein the memory is configured to store the 3D biometric model of the body part.

11. The electronic device of claim 10, wherein the at least one processor is further configured to:
obtain information on the body part,
generate the 3D biometric model of the body part,
compare the 3D biometric model of the body part of the user with the 3D biometric model of the body part of the user stored in the electronic device, and
perform actions on the electronic device, in response to determining that the 3D biometric model of the body part of the user matches the 3D biometric model of the body part stored in the electronic device.

12. The electronic device of claim 11, wherein the actions comprise at least one of locking the electronic device, unlocking the electronic device, locking an application in the electronic device, or unlocking the application in the electronic device.

13. The electronic device of claim 10, wherein the body part is within a field of view (FOV) of at least two imaging sensors.

14. The electronic device of claim 10,
wherein the at least one imaging sensor is further configured to capture the first image of the first portion of the body part and the second image of the second portion of the body part, and
wherein the at least one processor is further configured to:
illuminate, by using a second imaging sensor of the at least one imaging sensor, the first portion of the body part,
capture, by using the first imaging sensor of the at least one imaging sensor, the first image of the first portion of the body part,
detect a sliding movement of the body part, wherein the body part is slid to bring the body part from a field of view (FOV) of the first imaging sensor into a FOV of the second imaging sensor,
illuminate, by using the first imaging sensor of the at least one imaging sensor, from at least two imaging sensors the second portion of the body part, and capture, by using the second imaging sensor of the at least one imaging sensor, the second image of the second portion of the body part.

15. The electronic device of claim 10,
wherein the at least one imaging sensor is further configured to capture the first image of the first portion of the body part and the second image of the second portion of the body part,
wherein the at least one processor is further configured to:
illuminate, by using a first illuminating sensor of the at least one imaging sensor, the first portion of the body part;
capture, by using a capturing sensor of the at least one imaging sensor, the first image of the first portion of the body part;
illuminate, by using a second illuminating sensor of the at least one imaging sensor, the second portion of the body part; and
capture, by using the capturing sensor of the at least one imaging sensor, the second image of the second portion of the body part, and
wherein the first illuminating sensor and the second illuminating sensor are arranged in different sides from the capturing sensor.

16. The electronic device of claim 10,
wherein the at least one processor is further configured to:
control the 3D modeling engine to generate the 3D biometric model of the body part using the first image and the second image of the body part,
determine whether at least one location of the first portion in the first image of the body part overlaps with the second portion in the second image of the body part at a given instant of time, and
perform one of:
generating the 3D model of the body part using the first image and the second image of the body part, upon determining that the at least one location of the first portion in the first image of the body part overlaps the second portion in the second image of the body part at the given instant of time, or
generating the 3D biometric model of the body part by capturing a video of the body part by sliding the body part along at least two imaging sensors, upon determining that the at least one location of the first portion in the first image of the body part does not overlap the second portion in the second image of the body part at the given instant of time, and
wherein the first portion in the first image of the body part overlaps with the second portion of the second image of the body part at a later time when the body part has slid at a determinable speed.

17. The electronic device of claim 10, wherein the body part comprises one of a finger vein or an iris of the user.

18. The electronic device of claim 10, further comprising a display,
wherein the at least one processor is further configured to control to:
display a user interface for providing the user with a guide for the body part, and
wherein the user interface comprises at least one of a first guide item regarding a distance between the body part and the at least one image sensor, a second guide item regarding a slide direction, or a third guide item regarding a position of the body part to be captured.

19. The electronic device of claim 10, wherein the at least one imaging sensor comprises a first imaging sensor and a second imaging sensor.

20. The electronic device of claim 10, wherein the at least one imaging sensor comprises:
one imaging sensor; and
at least two illuminating sensors, each illuminating sensor arranged on a different side of the one imaging sensor.

\* \* \* \* \*